Nov. 1, 1938.　　　　　J. BIJUR　　　　　2,134,697
LUBRICATION
Original Filed Dec. 2, 1922　　2 Sheets-Sheet 1

Inventor:
JOSEPH BIJUR, DEC'D.
GEORGE BIJUR, EXECUTOR.

By Dean, Fairbank, Hinrichs, Foster
Attorneys.

Nov. 1, 1938.  J. BIJUR  2,134,697
LUBRICATION
Original Filed Dec. 2, 1922  2 Sheets-Sheet 2

Inventor:
JOSEPH BIJUR, DEC'D.
GEORGE BIJUR, EXECUTOR

By Dean, Fairbank, Hirsch & Foster
Attorneys.

Patented Nov. 1, 1938

2,134,697

UNITED STATES PATENT OFFICE 2,134,697

LUBRICATION

Joseph Bijur, deceased, late of New York, N. Y., by George Bijur, New York, N. Y., executor, assignor to Auto Research Corporation, a corporation of Delaware Original application December 2, 1922, Serial No. 604,464. Divided and this application December 26, 1933, Serial No. 703,940

13 Claims. (Cl. 184—7)

The present invention relates to lubricating installations and more particularly to oil lubrication of some or all of the bearings of the chassis of a motor vehicle or other mechanism.

This application is a division of prior application 604,464, filed Dec. 2, 1922 (Patent 1,940,784).

An object of the invention is to provide for a machine or system of machines and more particularly for a motor vehicle chassis, a simple and reliable installation, devoid of sensitive or delicate parts and operable substantially without effort for satisfactorily lubricating all or a substantial number of the bearings thereof, without the need for inspection of or manual access to said bearings.

Among other objects of the invention are, to provide an installation of the above type by which the lubrication is effected by operation at one or more conveniently accessible control stations, without the use of pressure pumps or outlet valves for the ends of the oil lines, or the need for pressure-tight lines, and in which the oil will pass reliably to the bearings without clogging, even after prolonged use.

Another object is to provide a lubricating installation, the use of which shall not require the exercise of any selective discretion, but in which, as the result of a simple manipulation, correct and sufficient lubrication is effected at each of the bearings, whether tight or loose and without excessive overflow.

The lubricating installation includes, a central control or charging station, filled by a single operation and associated with means to automatically subdivide the charge to feed to each of various bearings, a predetermined quantity of oil by drainage, preferably through lines open at their ends. The charging station may supply measured charges to sub-stations at various parts of the vehicle, each of the sub-stations supplying measured quantities to a plurality of bearings connected thereto. The drainage may be effected by gravity head between the charging station and the bearings, the feed to the bearing or bearings at the highest elevation being effected by the aid of a wick or wicks, if desired, or required.

The central or charging station may be a compartment receptacle associated with a main reservoir of oil, the separate compartments normally in communication therewith and being discharged by a pneumatic operation. The charging station may include a substantially closed receptacle having a plurality of compartments in the interior thereof, each draining to one of the sub-stations or direct to bearings, special means being provided to transport lubricant from a central reservoir to the charging station to completely fill the compartments therein, an overflow passage being provided to return to the main reservoir, the excess lubricant beyond that required to fill the compartments. This invention contemplates various alternative means for conveying lubricant from the main reservoir to the measuring compartments in the embodiment last referred to, among which are elevation through suction or pressure from the engine.

The sub-stations are preferably substantially sealed but suitably vented compartment boxes with which the draining conduits communicate, said boxes having compartments, one connected to each of the bearings, an oil spreading pad over the compartments, intercepting the oil admitted to the sub-station, to assure correct distribution thereof to the compartments therein.

The passage of the lubricant charge through the line may be facilitated by the application of pneumatic or gas pressure, either from the engine exhaust or from a special air or gas bottle, more particularly, where the oil is viscous as in cold weather, or where pipe lines of extraordinarily small bore are used. The pneumatic agent may be used as a substitute for the gravity head, and the charging station may accordingly be at an elevation lower than all or many of the bearings.

It is preferred to provide means for preventing the application of pneumatic pressure directly to the bearings, and to this end the pneumatic pressure is vented in advance of the bearings, the lubricant being intercepted for drainage to the bearings, substantially free from pneumatic pressure.

The above and other features of this invention may be more fully understood from the accompanying drawings in which are shown various possible embodiments of the several features of the invention.

In the figures:—

Figure 1:
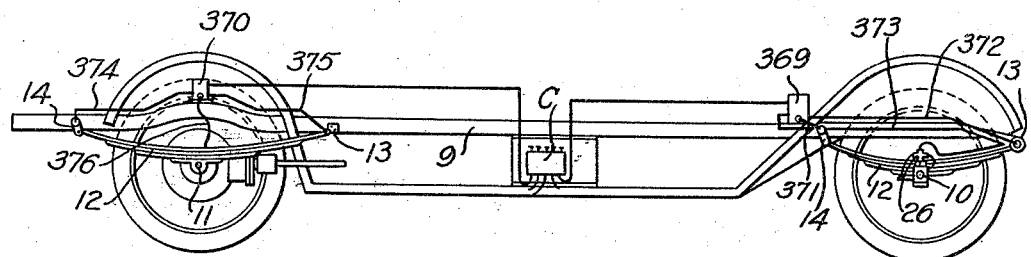
Fig. 1 shows an elevation of a vehicle chassis, with the elements of a lubricating installation diagrammatically indicated.

General layout—Fig. 1

The diagrammatic layout of Fig. 1 shows the chassis of a conventional automobile including the chassis frame having a front axle 10 and rear axle 11, springs 12 connecting said axles to said chassis frame 9, each spring being connected at its front end to the chassis by means of a bolt 13 and at the rear end by a spring shackle link 14 in the well understood manner. Disposed in any suitable place on the vehicle and to be more fully set forth in the description of various embodiments below, is a central filling charging or supply station, diagrammatically indicated at C from which definite charges of lubricant are supplied, as desired, to the various bearings. The charging station may include separate measuring compartments, (five being indicated diagrammatically in Fig. 3) connected by conduits to supply sub-stations, or distributing boxes, at the latter of which the oil is automatically subdivided for passage to bearings supplied therefrom, although some or all of the bearings may be supplied direct from the charging station.

Pneumatic propulsion or blast system

Where long conduit pipes are used, and particularly where such pipes are of very small diameter or where relatively viscous oil is employed, and especially for operation in cold weather, it is desirable to assist the gravity flow of the charges of lubricant to the sub-station or toward the bearings, by the application of a blast of air or gas, generically defined hereafter as a "pneumatic agent". This arrangement is also suitable in lieu of gravity feed where the main supply or charging station is at an elevation lower than that of the sub-stations or bearings.

An installation of the latter type is shown in Fig. 1 in which there is provided a main charging station C below the floor board of the vehicle for supplying lubricant to sub-stations, in this case, five in number, mounted as at 369 and 370 respectively near the front and rear of each channel frame. The lubricant drains from one compartment of sub-station 369 through conduit 371 to the adjacent spring shackle, from another compartment through conduit 372 to the spring bolt and a flexible conduit 373, supplies the king pin 26. The rear sub-station 370 similarly, by conduits 374 and 375 respectively, supplies the associated spring shackle and bolt, and a flexible conduit 376 shown in this embodiment as bridging loosely to the rear axle supplies the brake links (not shown).

The method of operation broadly consists in measuring separate charges of lubricant for the various collecting boxes or bearings and applying a blast of gas or air thereto, to propel it to said sub-stations. If the pneumatic agent were allowed to blow the lubricant all the way into the bearing, it might in blowing off or venting, eject from the bearing a substantial fraction of the lubricant delivered thereby. It is accordingly, a specific feature of the present method to prevent the pneumatic agent from exerting any effect beyond the collecting or sub-stations, the blast serving merely to propel the lubricant to the sub-stations from which the discharge to the bearings takes place by drainage either by gravity or by wick feed. In the preferred application, the lubricant is intercepted by the sub or collecting stations and the air or gas is allowed to escape therefrom into the open air.

Figure 2:
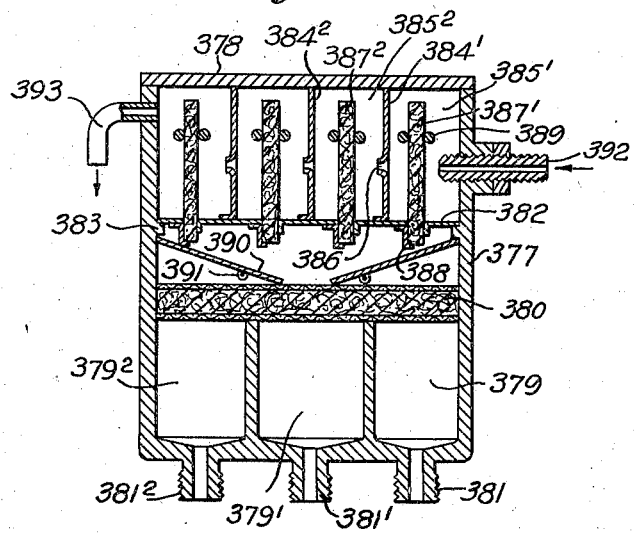
Fig. 2 is a view in longitudinal cross-section of a preferred form of collecting box used in the embodiment of Fig. 1.

For this purpose, the sub or collecting stations are preferably of the special construction shown in Fig. 2 comprising a vessel 377 closed by a cover 378 and provided at its bottom with the measuring compartments 379, 379', 379² of predetermined capacities covered by the combined filtering and spreading pad 380. Each compartment has a draining nipple 381, 381', 381² through which the proportioned quantity of lubricant passes therefrom to the corresponding bearing. Above the distributing pad, there is provided a horizontal partition 382 resting on ledges 383 at the side walls of the vessel and supporting a series of vertical partitions 384', 384², etc. defining a plurality of chambers 385', 385², etc. each partition provided with a small central aperture 386. Within each chamber 385 is provided a vertical oil intercepting pad 387', 387², etc. extending through a corresponding aperture in partition 382 and supported at its bottom in a corresponding clip 388, horizontal cross rods 389 maintaining said pads 387 against displacement. Guide plates 390 are supported on pins as at 391 within the vessel between the ledge 383 and the spreading pad 380 and serve as runways for delivering the lubricant near the middle of pad 380. An intake pipe 392 is disposed in one of the side walls of the collecting receptacle near the central axis of the pads 387 and a pipe 393 in the opposite wall serves for escape of the pneumatic agent, said pipe opening downward to avoid catching of dirt which might otherwise drop into the receptacle.

In operation, the lubricant propelled by a blast of air or gas enters the vessel 377 through pipe 392, a portion of the lubricant being absorbed by the pad 387' while the gas or air charged with the residue of lubricant passes through and around the edges of pad 387' and is forced through aperture 386 in partition 384', the operation being repeated at pads 387² etc. until the last pad has abstracted all of the small residue of lubricant, which passed the preceding pad, the pressure agent substantially free from lubricant being then vented through pipe 393. The lubricant on the various pads 387 drips therefrom and is guided by the plates 390 for delivery to the spreading pad 380 into the compartments 379 from which it drains.

Figure 3:
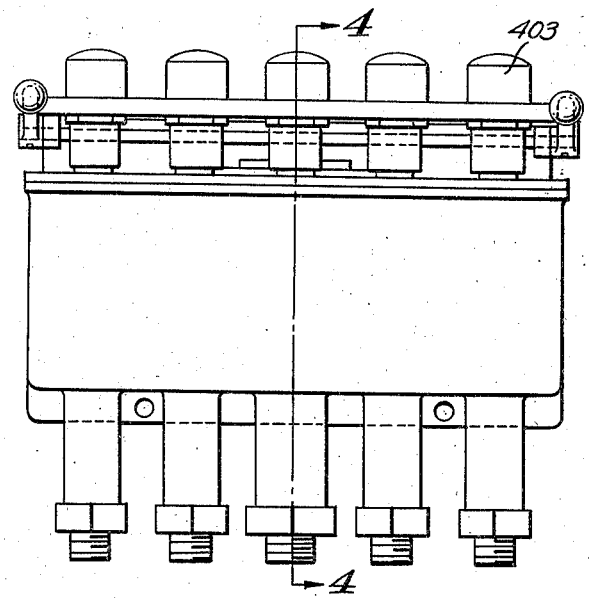
Fig. 3 is a front elevation of the charging station of Fig. 1.
Figure 4:
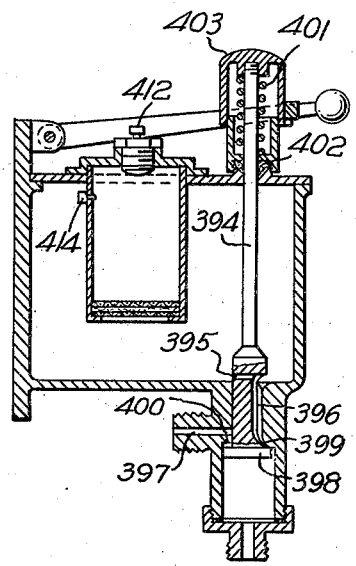
Fig. 4 is a view in longitudinal cross-section taken along the line 4—4 of Fig. 3.

In Figs. 3 and 4, there is provided a station indicated diagrammatically at C Fig. 1, at which the predetermined charges are first measured and the blast thereupon applied to propel it to the various collecting or distributing stations already described. The valve plunger 394 is provided with a transverse aperture 395, communicating with the upper end of the measuring cavity 396, which is brought into registry with a pressure air inlet tube 397 when the plunger is depressed, said inlet tube being connected to a bottle charged with air or gas or to the engine exhaust. The valve 398 is of disk form with a yielding non-sticking facing 399 for coaction with the annular valve seat 400, to effect a particularly tight seal, preventing leakage. In this embodiment, the return spring 401 is above the cover of the reservoir, confined between gland 402 and the top of hood 403, the latter serving both as the operating handle and as a guard to prevent dirt falling upon the gland.

In operation, as the plunger is depressed, a previously measured charge in the cavity 396 is allowed to escape to the line and the source of gas pressure being thereupon applied by the automatic registry of duct 395 with inlet duct 397, the lubricant is propelled by the blast of air or gas to the sub-station 369 or 370 connected to the cavity 396. The lubricant is collected in the sub-station and the pneumatic agent vented by the operation already set forth in the description of Fig. 2, the lubricant draining from the sub-station to the bearings free from pressure.

Figure 6:
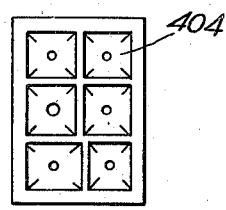
Fig. 6 is a sectional view taken along the line 6—6 of Fig. 5.
Figure 5:
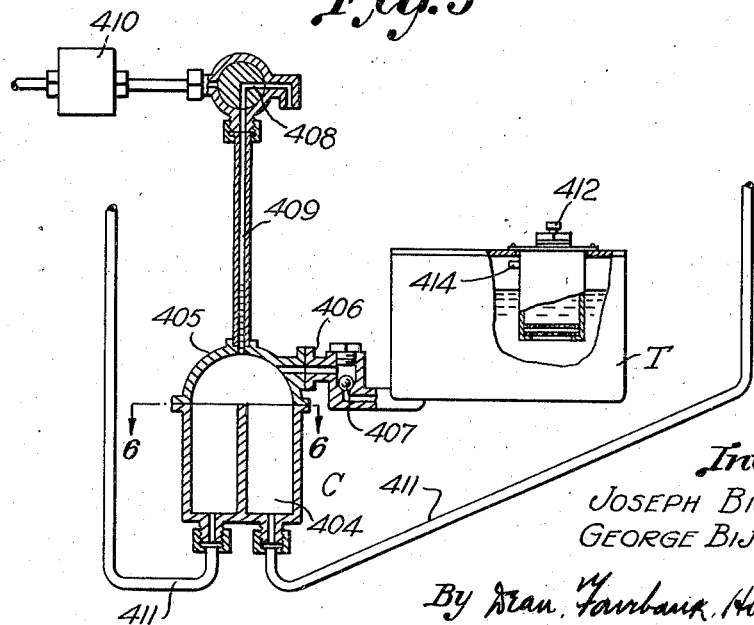
Fig. 5 is a view partly diagrammatic of an alternative means for urging measured charges of lubricant toward the bearings.

In Figs. 5 and 6 is shown an alternative arrangement for propelling measured quantities of lubricant by a blast. In this arrangement, the charging station is shown at C to be applied at an elevation preferably lower than that of the collecting station. The charging station has a plurality of measuring compartments 404 and is provided with a dome-shaped cover 405 connected to the main reservoir T by piping 406 within which is a check valve 407. The charging station is at an elevation lower than that of the lubricant in main tank T, so that lubricant normally fills said station as well as the dome thereof, since as shown in the drawings, the station is normally vented to the air through two-way valve 408. Valve 408 may be operated to connect the duct 409 from the measuring station to the source (not shown) of air or gas, whereupon the pneumatic agent will blow through a dust separator 410 of any desired construction through the valve 408 to the filling station 404, the check valve 407 preventing the blowing of lubricant back into the reservoir T. Lubricant is accordingly forced out the dome 405 and compartments 404 of the charging station C along conduits 411 to charge collecting stations of the type shown in Fig. 40, where the lubricant is automatically sub-divided for drainage free from pressure to the various bearings in the manner already described. The lubricant content of dome 405 will obviously be distributed to the compartments therebelow in proportions corresponding to the base areas thereof, so that the charge to each collecting station will be somewhat in excess of the volume of the compartment 404. The volumes of the elements are preferably so proportioned that the discharge from any compartment 404 including the allotment thereto from dome 405 will be sufficient to charge the corresponding collecting box.

By the expression "power source", utilized in the specification and claims, there is meant a conduit or reservoir or other means from which or by which gas pressures, different from atmospheric, may be derived to cause the flow of lubricant. It will be noted that in Figs. 1 to 6 of the present application, which correspond respectively to Figs. 39 to 44 of the parent application, Ser. No. 604,404, Patent No. 1,940,784, that the lubricant is permitted to flow from a central reservoir or supply to a plurality of measuring chambers or compartments adjacent the power source. From these chambers which measure or meter the lubricant there are a plurality of tubing lines leading to sub-metering or measuring stations adjacent the bearings. The lubricant is propelled from the main metering station to the sub-metering station by pneumatic pressure and feeds from the sub-station to the bearings by gravity. Thus there is shown and disclosed a system in which the main metering station receives lubricant by gravity and in which the sub-metering station distributes lubricant by gravity, while the lubricant is transferred from the main station to the sub-station by pneumatic pressure.

What is claimed is:—

1. A centralized lubricating installation for supplying the spaced bearings of a mechanism to be lubricated, said installation comprising a piping system having a plurality of tubing lines, a central lubricant supply feeding lubricant to said system, a power source for causing propulsion of the lubricant from said supply under pressure through said lines and metering means for proportioning the lubricant among said tubing lines, said metering means being located adjacent said source and said supply, receiving lubricant from said supply and lubricant propulsive power from said power source and supplying said tubing lines and metering means being also located adjacent said bearings and receiving lubricant from said tubing lines, the metering means at the bearings supplying the bearings by gravity.

2. A centralized lubricating installation for supplying the spaced bearings of a mechanism to be lubricated, said installation comprising a piping system having a plurality of tubing lines leading to the spaced bearings to be lubricated, a central lubricant supply feeding lubricant to said system, a power source for causing propulsion of the lubricant from said supply under pressure through said lines and metering means for proportioning the lubricant among said tubing lines and said bearings located at said supply and at said bearings, said means including a plurality of measuring means, said supply feeding the measuring means at the supply by gravity and said power source forcing lubricant from the measuring means at the supply to the measuring means at the bearings through said tubing lines and said measuring means at the bearings feeding the bearings by gravity.

3. A centralized lubricating installation for supplying the spaced bearings of a mechanism to be lubricated, said installation comprising a piping system having a plurality of tubing lines leading to the spaced bearings to be lubricated, a central lubricant supply feeding lubricant to said system, a power source for causing propulsion of the lubricant from said supply under pressure through said lines and metering means for proportioning the lubricant among said tubing lines and bearings, said means including a plurality of chambers of predetermined capacity respectively located at said supply and said bearings, the former being filled from said supply and supplying the latter through said tubing lines and the latter being supplied from said tubing lines and feeding said bearings by gravity and said power source supplying pneumatic pressure to said arrangement to force lubricant from the former chambers into said latter chambers.

4. In a centralized lubricating installation, in combination, bearings, a central source of lubricant removed from the bearings, a distributor having compartments adjacent the bearings, separate conduits connecting each of the compartments to a corresponding bearing, a conduit connecting said source to said distributor, means for applying pneumatic pressure to lubricant at said source for aiding in the propulsion thereof to said distributor and venting means at said distributor to vent said pneumatic pressure and prevent it from being supplied to the bearings.

5. In a remote control lubricating system, in combination, bearings, a measuring compartment reservoir, a central collecting vessel in the vicinity of said bearings and substantially removed from the reservoir, pneumatic means for propelling the measured charge to said collecting vessel, said collecting vessel having means for intercepting the lubricant and venting the propelling agent.

6. In a remote control lubricating system, in combination, bearings, a central measuring reservoir, a remote collecting vessel having compartments in the bottom thereof and in the vicinity of said bearings, a conduit connecting said measuring reservoir to said collecting vessel, pneumatic means for propelling the measured charge to said collecting vessel, said vessel having venting means and dividing means for distributing the lubricant to the compartments thereof in proportions corresponding to the base areas thereof and then to the bearings by gravity.

7. In a centralized lubricating installation, in combination, a central reservoir, a plurality of measuring chambers in the vicinity thereof and supplied therefrom, a plurality of collecting receptacles removed from said chambers and at different localities adjacent the bearings, conduit means connecting said chambers to associated collecting receptacles, said collecting receptacles having a plurality of compartments in the bottoms thereof draining connections from said compartments to associated bearings, means for applying pneumatic pressure to the lubricant in said measuring chambers to propel it to the associated collecting boxes, means to prevent the application of the propelling agent to the main body of lubricant in the reservoir, said collecting boxes having means for intercepting the lubricant and venting the pneumatic agent to permit gravity flow to the bearings.

8. In a lubricating system, in combination, a bearing, a source of lubricant, a source of pneumatic pressure, a conduit connecting said lubricant source to said bearing, means for applying pressure from said pneumatic source to lubricant from said first source to propel said lubricant through said conduit to said bearing, and an oil-separating member in the conduit in advance of the bearing, said member comprising oil-absorbing means by which the oil is separated from the propelling agent, and venting means for allowing escape of said agent, and means conveying the separated lubricant to the bearing.

9. In a lubricating system, in combination, an oil separator comprising a vessel, oil-absorbing pads therein, perforated partitions between successive pads, an inlet for lubricant and pneumatic propelling agent at one side of said pads, an outlet for the propelling agent at the opposite side of said pads, and outlet means for the collected lubricant.

10. In a lubricating system, in combination, a box having a plurality of measuring compartments at the bottom thereof, a plurality of oil-absorbing pads extending vertically near the upper end of said chamber, partitions between successive pads having small perforations, an intake passage at one side of said box for admission of oil and air under pressure, an outlet at the opposite side for the escape of air after the oil has been separated therefrom by said pads, and means interposed between said pads and said measuring compartments to sub-divide the lubricant therefrom in proportions approximating the relative base areas of the compartments.

11. In a centralized lubricating installation for a plurality of spaced and distributed bearings, a central lubricant reservoir, a lubricant propulsion agency, lubricant distributing means located adjacent said reservoir and said agency, lubricant sub-distributing means located adjacent said bearings, a conduit system connecting said reservoir to said distributing means, said distributing means to said sub-distributing means, and said sub-distributing means to said bearings, said lubricant being moved from said distributing means to said sub-distributing means by said agency.

12. The installation of claim 11 in which said agency is a source of pneumatic pressure.

13. The installation of claim 11 in which the lubricant passes from said reservoir to said distributing means and from said sub-distributing means to said bearings by gravity, said reservoir and said distributing means both being vented.

GEORGE BIJUR,
*Executor of the Estate of Joseph Bijur, deceased.*